United States Patent [19]

Shimada

[11] Patent Number: 5,416,887
[45] Date of Patent: May 16, 1995

[54] METHOD AND SYSTEM FOR SPEECH RECOGNITION WITHOUT NOISE INTERFERENCE

[75] Inventor: Keiko Shimada, Tokyo, Japan

[73] Assignee: NEC Corporation, Tokyo, Japan

[21] Appl. No.: 201,093

[22] Filed: Feb. 24, 1994

Related U.S. Application Data

[63] Continuation of Ser. No. 793,121, Nov. 18, 1991, abandoned.

[30] Foreign Application Priority Data

Nov. 19, 1990 [JP] Japan ................. 2-313049

[51] Int. Cl.⁶ .............................................. G10L 5/00
[52] U.S. Cl. .............................. 395/2.42; 395/2; 395/2.21; 395/2.4; 381/42
[58] Field of Search ............................ 381/42–43, 381/46; 395/2.21, 2, 2.2, 2.4, 2.42, 2.52–2.53, 2.56, 2.61

[56] References Cited

U.S. PATENT DOCUMENTS

| | | | |
|---|---|---|---|
| 4,713,777 | 12/1987 | Klorstad et al. | 381/43 |
| 4,783,802 | 11/1988 | Takebayashi et al. | 381/43 |
| 4,794,645 | 12/1988 | Watari | 381/43 |
| 4,881,266 | 11/1989 | Nitta et al. | 381/43 |
| 4,882,756 | 11/1989 | Watari | 381/42 |
| 4,908,865 | 3/1990 | Doddington et al. | 381/43 |
| 4,922,537 | 5/1990 | Frederiksen | 395/2.21 |
| 4,955,056 | 9/1990 | Stentiford | 381/43 |
| 4,989,248 | 1/1991 | Schalk et al. | 381/42 |
| 5,012,519 | 4/1991 | Adlersberg et al. | 381/46 |
| 5,025,471 | 6/1991 | Scott et al. | 381/43 |
| 5,073,939 | 12/1991 | Vensko et al. | 381/43 |
| 5,148,489 | 9/1992 | Erell et al. | 381/47 |
| 5,201,004 | 4/1993 | Fujiwara et al. | 381/46 |
| 5,212,764 | 5/1993 | Ariyoshi | 381/46 |

*Primary Examiner*—David D. Knepper
*Assistant Examiner*—Tariq Hafiz
*Attorney, Agent, or Firm*—Sughrue, Mion, Zinn, Macpeak & Seas

[57] ABSTRACT

In a speech recognition system for deciding an input pattern as one of reference patterns by calculating dissimilarities of the input pattern and the reference patterns and selecting the minimum one of the dissimilarities which is then compared with a reject value to decide the input speech as a particular reference pattern which produces the minimum dissimilarity, in order to reduce interference by noise accompanying an input speech pattern in the input pattern, a noise level is detected from an input pattern before the input speech pattern is detected and the reject value is produced corresponding to the noise level. The minimum dissimilarity is normalized by the time duration when the input speech pattern continues to produce a normalized value. The normalized value is compared with the reject value.

3 Claims, 2 Drawing Sheets

METHOD AND SYSTEM FOR SPEECH RECOGNITION WITHOUT NOISE INTERFERENCE

This is a continuation of application Ser. No. 07/793,121 filed Nov. 18 1991, now abandoned.

BACKGROUND OF THE INVENTION

The present invention relates to speech recognition for recognizing a speech uttered as one of the reference patterns registered and, in particular, to a speech recognition method and a system reducing interference caused by noise accompanying the speech uttered.

In a known speech recognition system, a speech uttered is converted into an input speech signal by an electromechanical transducer such as a microphone. The input speech signal is analyzed by a pattern analyzer and is converted into a digital input pattern signal. The input pattern signal is memorized in an input memory as a memorized pattern. The memorized pattern is compared with each of reference patterns registered in a reference memory and a dissimilarity is produced therebetween. When a particular one of the reference patterns provides the minimum dissimilarity, the speech uttered is recognized as the particular reference pattern. Alternatively, when a specific one of the reference patterns provides a specific dissimilarity smaller than a predetermined threshold value, the speech uttered is recognized as the specific reference pattern.

In actual recognition operation, the input speech signal is accompanied with noise due to the presence of background sound. The input speech signal and the noise are collectively referred to as an input sound signal. Accordingly, the input pattern signal includes a noise component. This results in a failure of the speech recognition.

SUMMARY OF THE INVENTION

It is an object of the present invention to provide a method and a system for recognizing speech without interference by noise component in the input speech signal.

The present invention is directed to a method for recognizing speech uttered as one of a number of reference patterns B1 through BN, each of the reference patterns comprising a time sequence of reference feature vectors Bn=b1n, ..., bjn, ..., bJn. The method comprises: (a) producing an input sound signal comprising an input speech signal representative of the speech uttered and noise accompanying one input speech signal; (b) analyzing the input sound signal to produce an input pattern representative of a pattern of the input sound signal; (c) observing the input pattern to detect a start and an end of the input speech and to produce a noise level z from a portion of the input pattern before the start is detected; (d) calculating a reject value r(z) dependent on the noise level z; (e) deriving another portion of the input pattern as an input speech pattern after the start is detected, the input speech pattern A comprising a time sequence of input feature vectors A=a1, ..., ai, ..., aI; (f) calculating inter-vector distances dn (i, j) between one of input feature vectors ai and each of reference feature vectors bjn for i=1 to I and j=1 to J; (g) calculating from those dn(i, j) the following asymptotic equation (1):

$$gn(i,j) = dn(i,j) - min\{gn(i-1, j-p)\}, \qquad (1)$$

where p=0, 1, 2, ..., and gmin{gn(i−1, j−p)} is a minimum of gn(i−1, j−p) for various value of p; (h) repeating the steps (f) and (g) for n=1 to N to produce dissimilarities of gn(I, Jn) for reference patterns B1 to BN; (i) selecting, as gN(I, Jn), the minimum one of those dissimilarities gn( I, In); (j) normalizing the minimum dissimilarity gN(I, Jn) by I to produce a normalized value GN(I, Jn); and (k) comparing the normalized value GN( I, Jn) with the reject value r(z) to recognize the input speech as a particular one BN of the reference patterns which produce the minimum dissimilarity gN(I, Jn), when the normalized value GN( I, Jn) is equal to or smaller than the reject value r(z).

According to the present invention, a system for recognizing a speech uttered is obtained which comprises reference memory means for memorizing a number of reference patterns B1 through BN, each of the reference patterns comprising a time sequence of reference feature vectors Bn=b1n, ..., bjn, ..., bJn; means for producing an input sound signal comprising an input speech signal representative of the speech uttered and noise accompanying the input speech signal; means coupled to the producing means for analyzing the input sound signal to produce an input pattern representative of a pattern of the input sound signal; observing means coupled to the producing means for observing the input pattern to detect a start and an end of the input speech and to produce a noise level z from a portion of the input pattern before the start is detected; means coupled to the observing means responsive to the noise level z for calculating a reject value r(z) dependent on the noise level z; input memory means coupled to the analyzing means for memorizing another portion of the input pattern as an input speech pattern after the start is detected, the input speech pattern A comprising a time sequence of input feature vectors A=a1, ..., ai, ..., aI; distance calculating means coupled to the reference memory means and the input memory means for calculating inter-vector distances dn(i, J) between one of input feature vectors ai and each of reference feature vectors bjn for i=1 to I, j=1 to J, and n=1 to N; asymptotic equation calculating means coupled to the distance calculating means for calculating from those dn( i, j) the following asymptotic equation (1):

$$gn(i,j) = dn(i,j) - min\{gn(i-1, j-p)\}, \qquad (1)$$

where p=0, 1, 2, ..., and min{gn(i−1, j−p)}is a minimum of gn(i−1, j−p) for various value of p, the asymptotic equation calculating means producing dissimilarities gn( I, Jn) for n=1 to N; deciding means coupled to the asymptotic equation calculating means and the reject value calculating means for selecting, as gN(I, Jn), the minimum one of N dissimilarities gn( I; Jn) and normalizing the minimum dissimilarity gN(I, Jn) to produce a normalized value GN(I, Jn), the deciding means comparing the normalized value GN(I, Jn) with the reject value r(z) to decide, as a recognition result, a particular one of reference patterns which produces the minimum dissimilarity gN(I, Jn), when the normalized value GN(I, Jn) is equal to or smaller than the reject value r ( z ).

DESCRIPTION OF THE PREFERRED EMBODIMENTS

Figure 1:
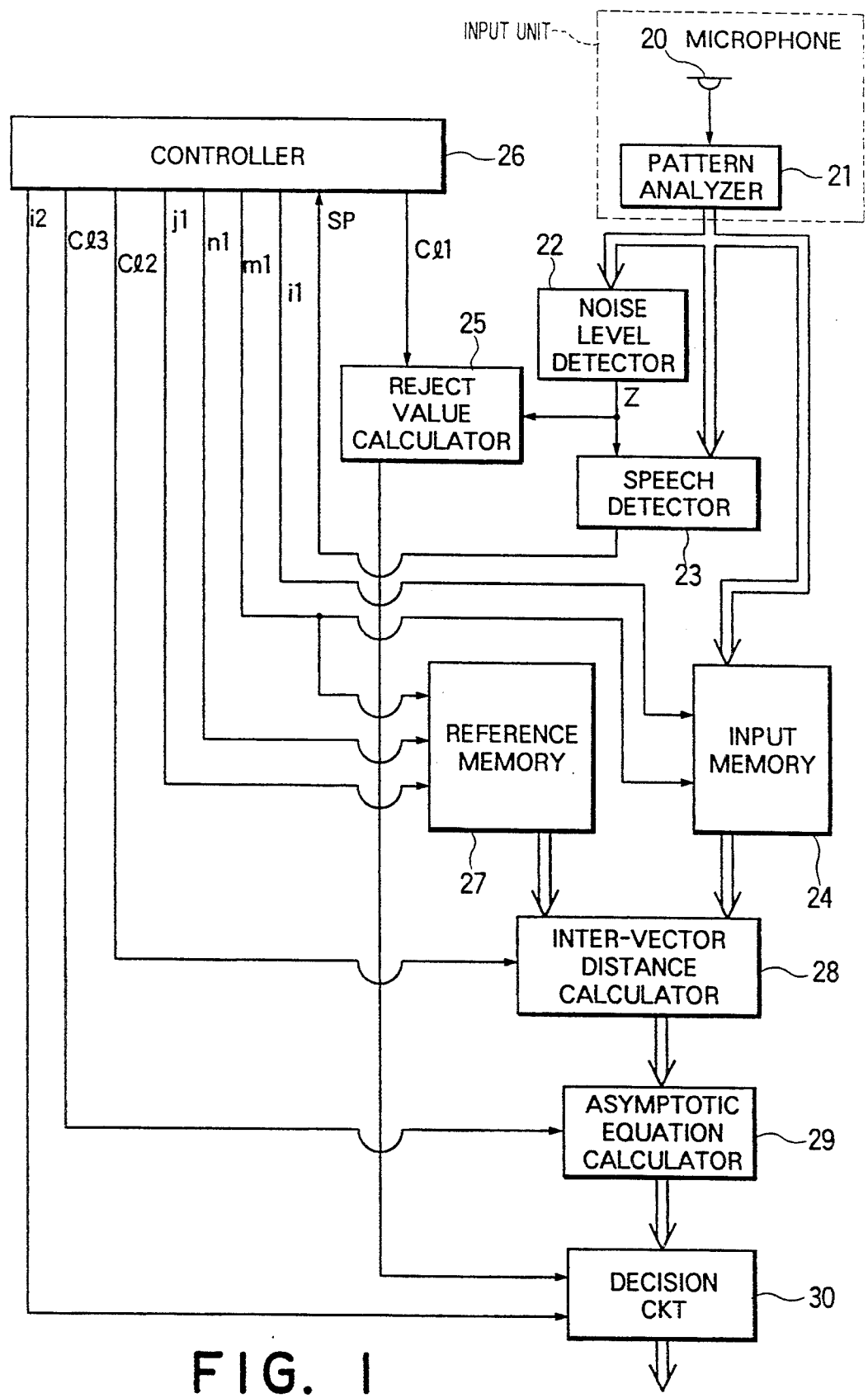
FIG. 1 is a block diagram view of a speech recognition system according to an embodiment of the present invention.

Referring to FIG. 1, the shown system according to an embodiment comprises a microphone 20 for converting a sound into an electric signal as an input sound signal, and a pattern analyzer 21 for analyzing the input sound signal into an input pattern. The input sound signal comprises an input speech signal representative of input speech and noise. The pattern analyzer 21 is, for example, a frequency analyzer well known in the art which comprises a multi-channel bandpass filter bank for separating the input sound signal into different frequency component signals. The frequency component signals are multiplexed to form a signal representative of a feature vector. Accordingly, the pattern analyzer 21 generates a time sequence of feature vector signals.

The feature vectors are applied to a noise level detector 22, a speech detector 23 and an input memory 24.

The noise level detector 22 receives the feature vectors and holds them in a buffer memory. The noise level detector 22 monitors the input level of the time sequence of feature vectors and compares the input level with a threshold level. When the noise level detector 22 detects that the input level exceeds the threshold level, it calculated an average of data of the input level which are held in the buffer memory before the input level exceeds the threshold level. The average is delivered, as a noise level z, to the speech detector 23 and a reject value calculator 25.

The speech detector 23 receives the noise level Z and compares the input level of the time sequence of feature vectors with the noise level z to produce a speech start signal as a signal SP when the input level becomes equal to or exceeds the noise level. Thereafter, the speech detector 23 also produces a speech end signal as the signal SP when the input level becomes lower than the noise level z.

The signal SP is delivered to a controller 26. When the controller 26 receives the speech start signal as the signal SP, the controller 26 delivers a take-in signal i1 to the input memory 24. The input memory 24 stores the time sequence of input feature vectors a1, a2, ..., ai, ..., and a I in this order in response to a time sequence of take-in signals i1.

In response to the speech start signal as the signal SP, the controller 26 also produces a control signal C11 to the reject value calculator 25.

Figure 2:
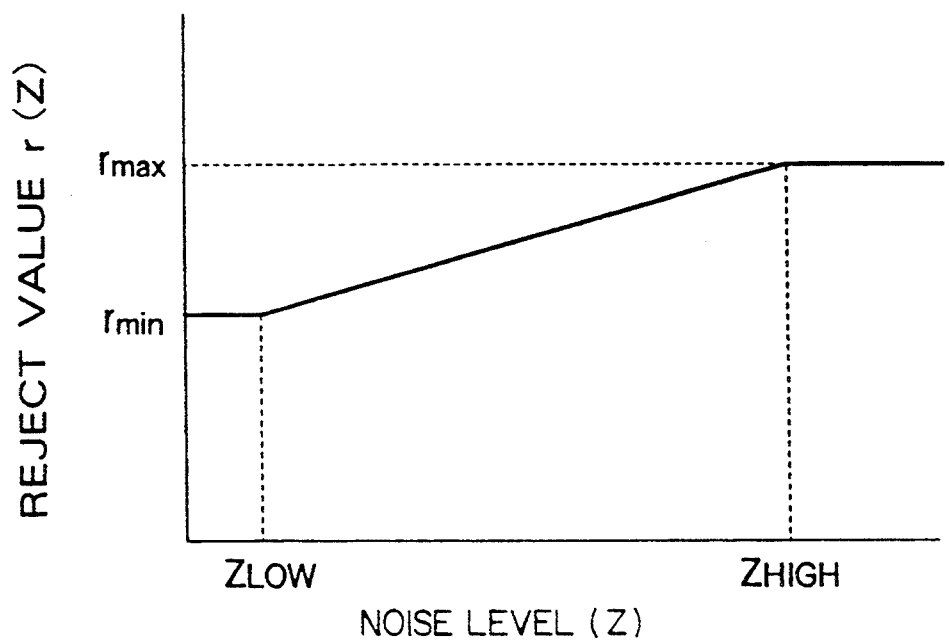
FIG. 2 is a graph illustrating a relationship between a reject value and a noise level.

Then, the reject value calculator 25 calculates a reject value r(z) using the noise level z just before receiving the control signal C11, that is, before the speech start is detected. The reject value r(z) is given by the following formulae:

$$r(z) = \begin{cases} r_{min} & (z < z_{low}) \\ \alpha z + \beta & (z_{low} \leq z \leq z_{high}) \\ r_{max} & (z > z_{high}), \end{cases} \quad (1)$$

where, $r_{min}$ and $r_{max}$ are the minimum value and the maximum value of the reject value r, respectively, $z_{low}$ and $z_{high}$ being a lower limit and a higher limit of the noise level z, $\alpha = (r_{max} - r_{min})/(z_{high} - z_{low})$, and $\beta = (r_{min} z_{high} - r_{max} z_{low})/(z_{high} - z_{low})$. FIG. 2 illustrates a relation between the noise level z and the reject value r(z).

The system has a reference memory 27 which memorizes a number of (N) reference patterns B1, B2, ..., Bn, ..., BN. Each of the reference patterns comprises a sequence of feature vectors, that is, Bn = b1n, b2n, ..., bjn, ..., bJN.

The controller 26 produces a reference pattern selection signal n1 for selecting one of the reference patterns to the reference memory 27. Thus, a particular one Bn of reference patterns is selected.

The controller 26 also produces a read signal j1 to the reference memory 27. Thus, bjn of the reference vectors of the particular reference pattern Bn is read from the reference memory 27 and delivered to an inter-vector distance calculator 28. Also, ai of the input feature vectors is read out and delivered to the inter-vector distance calculator 28 in response to the signal i1. Each of the input memory 24 and the reference memory 27 supplies M feature vectors to the inter-vector distance calculator 28 according to a signal m1 from the controller 26.

The inter-vector distance calculator 28 calculates a distance dn(i, j) between the input vector ai and the reference vector Din under control by a control signal c12, The distance dn(i, J) is delivered to an asymptotic equation calculator 29.

The asymptotic equation calculator 29 calculates the following asymptotic equation (2):

$$gn(i, j) = dn(i, j) - min\{gn(i-1, j-p)\}, \quad (2)$$

where p = 0, 1, 2, ..., and the second term of min{gn(i−1, j−p)} is a minimum value of gn(i−1, j−p) along a various values of p.

An initial value of gn(i, j) is given by gn(0, 0) = 0.

Thus, the asymptotic equation calculator 29 calculates dissimilarities gn(i, j) for i = 1, 2, ..., I, j = 1, 2, ..., Jn, and n = 1, 2, ..., N to produce N dissimilarities gn(I, Jn) between the input speech signal and N reference patterns Bn. The numerals (n, i, j) are indicated by a signal c13 from the controller 26.

The asymptotic equation calculator 29 is provided with a decision circuit for deciding min{gn(i−1, j−p)}, a buffer memory for holding min{gn(i−1, j−p)} and gn(i, j), and a memory for holding N dissimilarities gn(I, Jn) between the input speech signal and N reference patterns Bn.

When the controller 26 receives the speech end signal as the signal SP from the speech detector 23, the controller 26 generates a control signal i2 to a decision circuit 30.

In response to the control signal i1, the decision circuit 30 takes in the N dissimilarities gn(I, Jn) from the asymptotic equation calculator 29 and decides the minimum one (gN(I, Jn)) of the gn(I, Jn). Then, the decision circuit 30 normalizes gN(I, Jn) by I as GN(I, Jn).

Responsive to the control signal i2, the decision circuit 30 also takes in the reject value r(z) from the reject value calculator 25 and compares the normalized minimum dissimilarity GN(I, Jn) with the reject value r(z). When the GN(I, Jn) is equal to or smaller than the reject value r(z), the decision circuit 30 recognizes that the input speech coincides with a particular one BN of the reference patterns which gives the minimum one gN(I, Jn) of the dissimilarities gn(I, Jn) to produce the particular reference pattern BN as a decision result.

When the GN(I, Jn) is larger than the reject value r(z), the decision circuit 30 recognizes that no reference pattern coincides with the input speech pattern.

The pattern matching method is known in the art as the DP (Dynamic Programming) matching method where dissimilarities calculated by use of the asymptotic equation (2) is compared with the reject value. According to the present invention, the reject value r is determined dependent on the noise level and the pattern matching is therefore performed without affect of the noise.

What is claimed is:

1. A speech recognition device for use in recognition of speech mixed with background noise, comprising:
   a reference memory for keeping a plurality of reference patterns;
   an input unit for converting an input sound signal derived from the speech mixed with the background noise to an input pattern having an input level;
   a noise level detector for receiving the input pattern from the input unit, finding a threshold point where the input pattern first exceeds a threshold level, calculating a noise level from a portion of the input pattern preceding the threshold point, and for producing a noise signal representative of the noise level;
   a speech detector unit for receiving the input pattern from the input unit, for comparing the input level with the noise level to detect a portion of the input pattern having a level exceeding the noise level, and for outputting the portion detected as a speech pattern;
   a reject value calculator supplied with said noise signal for calculating a reject value corresponding to the noise level of said noise signal to produce a reject value signal representative of the reject value; and
   a pattern matching unit supplied with the reference patterns from the reference memory, the speech pattern from the speech detector unit, and the reject value signal from the reject value calculator, for selecting as a result of recognition of the speech one of the reference patterns that has a best degree of pattern match relative to the speech pattern, and accepting the selected pattern as a correct pattern when a difference between the speech pattern and the selected pattern is not greater than said reject value.

2. A speech recognition device as claimed in claim 1, wherein
   said reject value calculator compares said noise level with a lower limit and a higher limit to determine the reject value,
   the reject value being linearly variable between a minimum and a maximum value when said noise level is between the lower limit and the higher limit,
   the reject value being given the minimum value when said noise level is lower than the lower limit,
   the reject value being given the maximum value when said noise level is higher than the higher limit,
   and wherein said pattern matching unit does not accept said selected pattern as the correct pattern when the difference between the speech pattern and the selected pattern is not greater than the reject value.

3. A speech recognition device for use in speech recognition when analyzing speech mixed with background noise, comprising:
   a reference memory for keeping a plurality of reference patterns;
   an input unit for producing, from a single sound input comprising the speech mixed with the background noise, an input pattern;
   a noise level detector for receiving the input pattern from the input unit, determining a first level, representing a noise level, that precedes a second level that is above a threshold level, at a point where the input pattern rises to said second level, and producing a noise signal representative of the noise level;
   a speech detector unit for receiving the input pattern from the input unit, comparing the input level with the noise level to detect a portion of the input pattern having a level exceeding the noise level, and outputting the portion as a speech pattern; and
   a pattern matching unit for selecting one of the reference patterns best matching the speech pattern.

* * * * *

UNITED STATES PATENT AND TRADEMARK OFFICE
CERTIFICATE OF CORRECTION

PATENT NO.    : 5,416,887
DATED         : May 16, 1995
INVENTOR(S)   : Keiko Shimada It is certified that error(s) appears in the above-identified patent and that said Letters Patent is hereby corrected as shown below:

Column 2, Line 7, delete "In" and insert --Jn--.

Column 3, Line 50, delete "C11" and insert --Cl1--.

Column 3, Line 54, delete "C11" and insert --Cl1--.

Column 4, Line 25, delete "Din" and insert --Bjn--.

Column 4, Line 42, delete "c13" and insert --cl3--.

Signed and Sealed this

Twenty-second Day of August, 1995

*Attest:*

BRUCE LEHMAN

*Attesting Officer*    *Commissioner of Patents and Trademarks*